Figure 1:
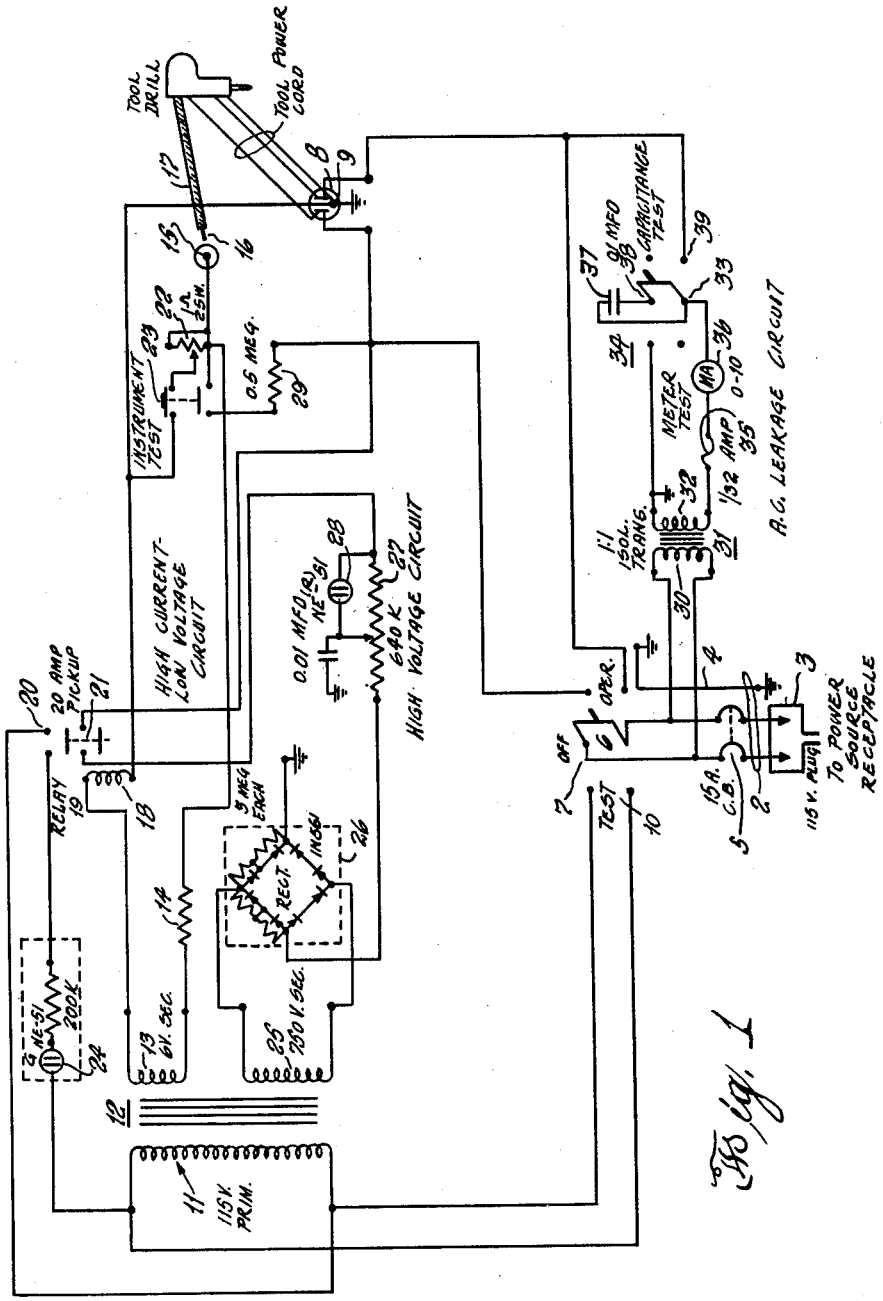

INVENTOR.
SAMUEL H. BEHR
BY
Ernest J Weinberger
ATTORNEY

United States Patent Office 3,141,128
Patented July 14, 1964

3,141,128
APPARATUS FOR TESTING PORTABLE EQUIPMENT FOR A.C. AND D.C. LEAKAGE AND FOR GROUND CONTINUITY
Samuel H. Behr, 1046 Pembroke St., Uniondale, N.Y.
Filed June 26, 1961, Ser. No. 119,743
7 Claims. (Cl. 324—51)
(Granted under Title 35, U.S. Code (1952), sec. 266)

The invention described herein may be manufactured and used by or for the Government of the United States of America for governmental purposes without the payment of any royalties thereon or therefor.

The present invention relates to the testing of electrical equipment and for determining the electrical condition of such equipment. More particularly, the invention relates to performing a plurality of evaluations of the electrical power system of the equipment whereby it can be judged whether the equipment is electrically safe for personnel operation.

Electrically powered equipment, in general, receives its energy by way of an electrical cable and the cable conductors supplying electrical energy are entirely isolated from each other and from the frame of the equipment. Should either of the live power conductors of a two conductor, ungrounded system or the live conductor of a grounded system be shorted to the frame and the frame be ungrounded, then insufficient current will flow through these conductors to activate any protective devices such as fuses or circuit breakers, yet, however, under these conditions the frame of the equipment will be at the same potential as the shorted conductor and a person contacting this frame while offering a return path to the power system ground would receive an electrical shock much as he would should he directly contact the live conductor. This of course exemplifies the worst possible situation. A more common occurrence is where there is a partial shorting of a live conductor to the equipment frame which frame is not properly grounded. Generally speaking, two electrical conditions must be satisfied in order to present a shock hazard. First, the equipment frame must be improperly grounded either through an open or high impedance circuit and secondly, a low impedance or short of one of the live conductors to the frame must occur. The most common equipment subject to this type of failure is that of a portable nature, such as small portable electric tools. It is, therefore, mandatory and good practice to check such tools before and during service. In order to provide the minimum testing the ground circuit impedance and the insulation resistance of the conductors to the frame must be measured. It is obvious that minimum values for these conditions should be set in relation to the effects on a human being. One of these conditions is related to the maximum "let go" current which is the current passing through a human body where the muscular control is just retained. In other words, a greater current does not allow control of certain body muscles and, for example, the hand cannot be opened to release a live source. The "let go" current is generally between 6 and 9 milliamperes whereas 0.5 milliampere is just sufficient to be physically perceived. From these two factors the minimum standards for an electrical tester may be ascertained. Knowing the maximum current that is considered "safe" for the average person, the minimum insulation resistance and maximum ground resistance are determined.

The measurements which are presently employed apply a high A.C. voltage to or across the insulation and measure the current therethrough and a high current to the ground circuit, while at the same time, the operating voltage is applied to the equipment to determine its normal operation. It should be noted that not only is the sensitivity of the measuring instrument or tester and the sequence of its operation of prime importance, but the type of measurement must also be accounted for.

Presently available testers exhibit several inherent disadvantages. These include a sensitivity far below the safety standards desired, a sequence of operation which permits the operation of the equipment under test without dependence on the satisfactory passage of other tests. An example of this is the measurement of the condition of a portable drill used aboard a naval ship. The measurements are made under the best of environmental conditions while in the field the tool may be used under more hazardous condition. The tester sensitivity may be such as to indicate electrically acceptable operation since when actually used the operator or user may offer an extremely low resistive path to ground due to dampness, body perspiration. The equipment tester sensitivity is usually such that a satisfactory condition is indicated. That is, the body current is below "let go"; however, when body resistance is reduced, this current far exceeds "let go" and presents a definite hazard. Present testers due in part to their design, method and principle of operation are severely limited in their sensitivity and versatility. What is required of present day safety type instruments is that they be accurate, sensitive, easy to use and convenient. It is advisable that they be designed so that they may be readily employed by an unskilled operator. Further, since power line systems are of two general types that is, where one of the conductors is grounded (grounded system) and where neither of the conductors are grounded (ungrounded system), a tester should be able to evaluate either one without any or substantial modification.

An object of this invention is to provide a sensitive accurate electrical tester.

Another object is to provide a simple, convenient, inexpensive, accurate tester for portable equipment which is operable by an unskilled operator.

Still another object is to provide a tester which is capable of field use and employs a sequence of operation which prevents the application of high voltage in the event that there is a failure at safe, low voltages.

Figure 2:
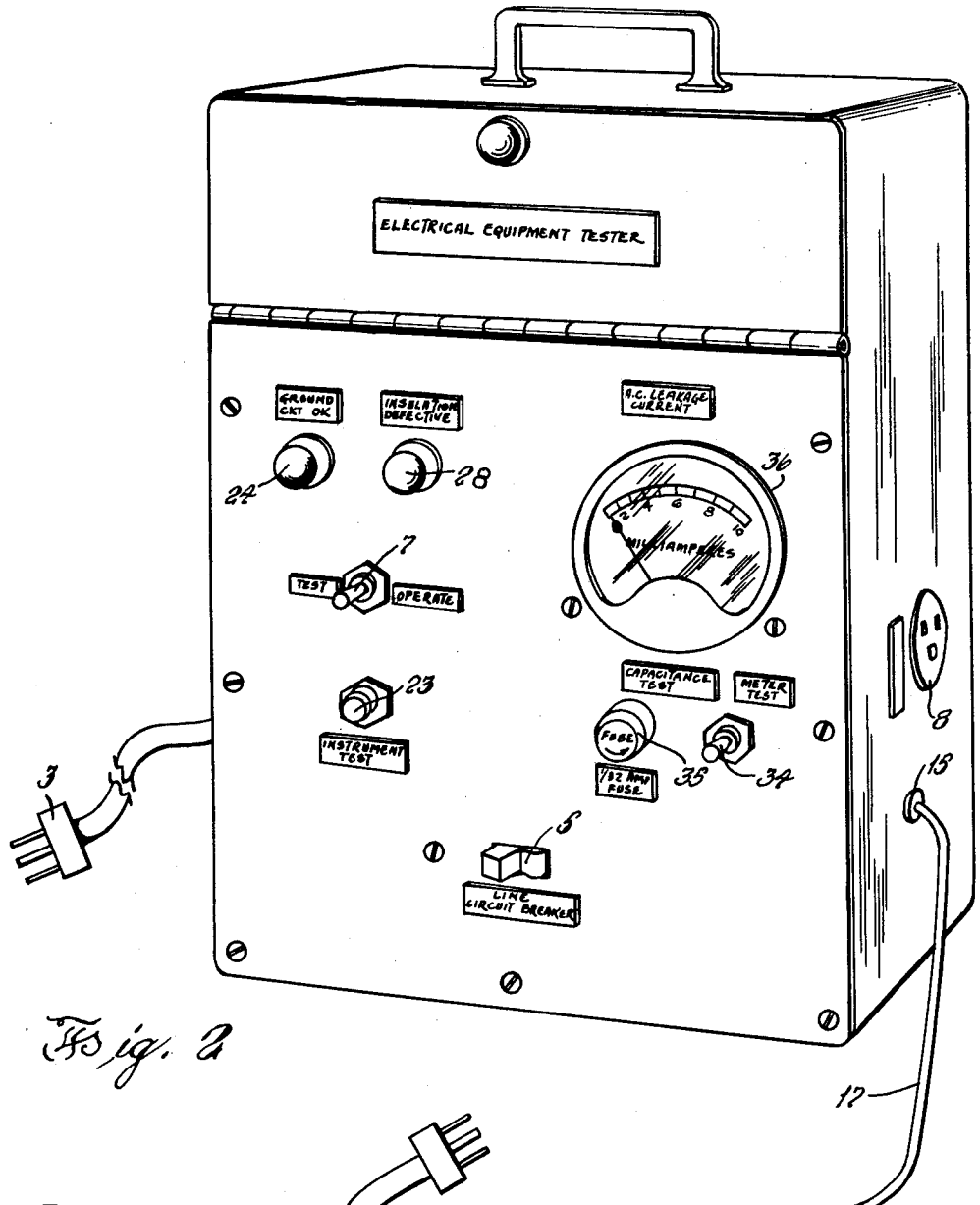

Other objects and many of the attendant advantages of this invention will be readily appreciated as the same becomes better understood by reference to the following detailed description when considered in connection with the accompanying drawings, wherein:

FIG. 1 is a diagrammatic electrical circuit of an embodiment made in accordance with this invention, and FIG. 2 is a front elevation view of a tester made in accordance with this invention.

In the illustrated embodiment of FIG. 1, a three wire cable 2 having a polarized three prong plug 3 connected to one end is energized through a mating receptacle (not shown). One of the cable conductors 4 is grounded either through the receptacle or by some other convenient manner to the power system ground. The opposite end of this ground conductor is employed to ground the frame or chassis of the tester or maintain it as some reference potential. Circuit breakers 5, or where desired thermal fuses, are in series with the power cable conductors whose free ends are joined to the pole contacts 6 of the double pole double-throw switch 7. Since the duration of any of the tests to be performed is relatively short and to fully protect the tester and equipment, this switch may be of the momentary contact variety by providing a spring (not shown) return to the open position where the normal pole position is such that there is no voltage on any of the contacts other than the switch poles. The switch 7 in effect divides the tester into two circuits, one which allows the equipment under test to operate and the other which permits the physically testing of the electrical condition of the equipment.

Considering the equipment to be tested which in most cases is a portable device or tool such as a drill, etc., it is a standard safety procedure to ground the metallic frame of the tool. This grounding is generally accomplished by a ground lead in the power cable of the tool much as that described in relation to plug 3. The tester is provided with a polarized three terminal receptacle 8 which mates with the tool power plug and also grounds the tool frame to the tester chassis through the ground terminal 9. Before any electrical energy is supplied to the tool the ground and insulation of the tool should be evaluated in order to prevent damage and possible injury to the operater. It is for this reason that the tester circuitry will be described in the order of its chronological use. The test position contacts 10 of switch 7 are connected across the primary winding 11 of transformer 12 which has two secondary windings. One of these secondary windings 13 is a low voltage-high current secondary and forms a part of the ground test circuit. In series with the secondary 13 is a current limiting resistor 14, a terminal receptacle 15 which mates with plug 16 of a ground bus 17 whose other end is clamped or in any suitable manner electrically joined to the tool frame. Since the tool frame is or should be grounded through the tool cable to the receptacle tester ground, this is part of the series path with the winding 18 of a relay 19 having two pairs 20 and 21 of normally open contacts. The secondary 13 provides a low voltage source capable of delivering a current of 20 amperes into the load circuit connected across it. The resistor 14 is used in order to limit the short circuit current although the transformer 12 may be chosen of the type where the impedance of this secondary is sufficiently high so as to be self-limiting with respect to the current drawn. The impedance values of the resistor and relay winding 18 are relatively low and so the current flowing in this circuit is quite large. This high current is used in order to test the ground system of the tool under the worst possible condition. This is one where a mere resistance check would indicate a closed or complete ground loop although one strand of wire or a partially corroded connection forms a part of this loop. With the application of a heavy current, this single wire or poor electrical connection would break down and the ground loop would become an open circuit. Knowing the above impedances and the fact that the tool ground loop should, for safety, be less than 0.2 ohm the current passing through the relay winding is calculated. The relay is set to pick up or close its contacts for any current in excess of this rated minimum which for the illustrated embodiment is approximately 20 to 30 amperes. For the benefit of the operator, the tester is provided with an instrument calibrate circuit which consists essentially of a variable low resistance 22. This resistance is substituted or placed across the receptacle 15 and the tester ground to simulate the tool ground loop by a double pole-single throw instrument test switch 23. Under these conditions, if the low resistance 22 is marked indexed as to its resistance, the relay 19 may be adjusted to close for any selected value of resistance. Thus, if it is desired to set the minimum ground resistance at 0.1 ohm the resistance 22 is set for 0.1 ohm, placed across the circuit with the secondary energized and the relay adjusted to just close for the current flowing therethrough. This calibration insures that if the tool ground loop resistance exceeds 0.1 ohm the relay 19 will not be activated. It is best to give the operator a visual indication of a satisfactory ground and therefore a visual indicator such as a filament lamp or neon lamp 24 is included in a series circuit with the transformer primary 11 and the relay contacts 20. When the current in the tool ground loop exceeds the relay pickup current the contacts 20 are bridged and the primary voltage which is derived through switch 7 is applied across the lamp 24 causing it to light and thereby indicate a satisfactory ground.

The other secondary winding 25 of transformer 12 provides a high voltage and low current which is rectified, as for example, by a full wave bridge type rectifier 26 or any other suitable, well-known rectifier means. This circuit serves to enable the tester to measure and indicate the condition of the tool insulation. One output of the rectifier is grounded to the chassis of the tester while the high potential lead is series connected to one of the terminals of contacts 21 of relay 19 through a variable resistor 27 or potentiometer. A neon glow lamp 28 electrically disposed between the slide terminal and one end of resistor 27 is adjusted to fire upon the passage of a selected current through the resistor and more specifically upon the development of a particular voltage across the terminals of the resistor. The other terminal of contacts 21 is tied to one power terminal of receptacle 8 with which the tool power cord plug mates. In order to provide a calibration circuit similar to that described in conjunction with the tool ground circuit a resistor 29 is placed across the high potential rectifier output and the tool ground by one pair of the contacts of instrument test switch 23. With this switch 23 momentarily depressed, the resistor 29 which is selected to be of a value comparable with a "safe" insulation resistance, is substituted for the tool insulation and the slide of potentiometer 27 adjusted to the firing threshold of the neon lamp 28. With this calibration, if the tool insulation resistance does not exceed this comparable resistance then the neon will light and indicate thereby an unsafe or defective insulation. It is of interest to note that the high potential of the rectifier has been connected to only one terminal of receptacle 8 and thusly to only one power leg of the tool. This arrangement has proved quite satisfactory when one considers that in general there is a low impedance between the power leads in almost all devices. Generally it is a winding of a motor, a heating element or the like. Therefore by applying the high voltage between one lead and the ground or tool frame, it is also applied to the other lead, there being practically no voltage drop across the power leads. On the other hand, where circumstances warrant that the insulation resistance of each lead be evaluated separately, then a cross-over switch (not shown) may be inserted before the receptacle to permit the application of the high voltage to either "hot" terminal but not the ground terminal. This procedure is acceptable where it is contemplated that numerous changes are required, but if only both terminals are to be checked a few times, then it is much simpler to merely interchange the receptacle terminal connections.

Most rotary portable tools and especially those having brush type motors are generators of rather intense radio frequency signals. These signals are referred to as radio interference and generally are unwanted and must be suppressed. In suppressing this interference a pair of 0.1 microfarad capacitors or filters are placed, one from each power lead of the tool to the frame or ground. When the tool is operated from an A.C. power source, approximately several milliamperes will flow through the capacitors to the tool frame and if this tool is not properly grounded, then this current will flow through the operator. This capacitance or filter current may approach the perceptible shock current and even in some cases the "let go" current and therefore it is essential that this current be measured independently of any insulation current that might flow since it is their cumulative effect that is hazardous. Measuring the insulation resistance or current with an A.C. source prevents any possible separate determination of these currents and hence for any measurement, it cannot be evaluated whether the insulation or the filter is unsatisfactory. In this respect if two measurements are made, namely, the D.C. insulation leakage current and the A.C. leakage or filter current, then a complete picture of the electrical condition of the tool is obtained. This problem has been solved by providing a circuit which operates in conjunction with the aforedescribed circuitry to obtain this additional required vital data. The primary winding 30 of an isolation 1:1 type transformer 31 is bridged across the poles of switch 7 while one end of the secondary winding 32 is tied to the tester or chassis ground. The ungrounded end of secondary 32 is connected to one pole 33 of double pole-double throw switch 34 through a fuse 35 and a milliammeter 36. The grounded secondary end is joined to one of contacts of the meter test portion of the switch 33. A 0.1 microfarad capacitor 37 across the pole contacts 33 and 38 serves to provide a calibration element which simulates the filter or capacitor across the tool power lead and its frame. The opposite switch capactive test contact 39 is connected to the power terminal of receptacle opposite that terminal on which the high voltage is applied.

A complete comprehension of this invention will be derived by summarizing the physical operation of the tester. Reference will be made primarily to FIG. 1 but an overall view of the tester and its layout will be appreciated by examining FIG. 2 wherein the same figure designations have been employed for similar components. The tester is first energized from a convenient power supply (e.g., 115 volt A.C.), not shown, by way of plug 3. It should be observed that the power supply may be either of the type where one power lead is grounded or where neither power lead is at ground potential. This problem has, however, been alleviated by the use of transformers 12 and 31 and therefore it is inconsequential what type of supply is available. This same reasoning is applicable to the equipment or tool under evaluation. At this point the tester should be checked for correct internal operation and proper calibration, and therefore the tool need not be connected to the tester as yet. By throwing switch 7 into the test position, power is applied to transformer 12 and when the instrument test switch is operated, resistor 22 is placed in the low voltage secondary loop and acts as a load simulating the tool ground loop. At the same time resistor 29 enters the high voltage circuit and performs the same function. If the current in the low voltage circuit is of the proper magnitude relay contacts 21 and 20 will close thereby completing the high voltage circuit and at the same time, causing lamp 24 (ground circuit O.K.) to light. Since lamp 28 (insulation defective) is set to fire only when the current in this circuit exceeds a certain selected value, namely, that current which indicates a low or unsatisfactory insulation and the resistor 29 is of a resistance which is equivalent to just below the minimum acceptable insulation resistance, then if the lamp 28 does ignite this tester circuit is O.K. In other words, if both lamps are ignited, then the tester is operating correctly. The A.C. leakage circuit must now be checked by closing switch 34 in the meter test position (places 0.1 microfarad capacitor 37 across the secondary of transformer 31). If this circuit is satisfactory and the tester is energized with 120 volts 60 cycles, then milliammeter 36 should indicate approximately 5 milliamperes.

After this preliminary check, all the switches are opened and the power cable of the tool or equipment under test is inserted into test receptacle 8 and ground cable 17 is connected between the tool metallic frame and receptacle 15. If the equipment being tested has a power switch, it should be closed. Now with switch 7 in the test position, only lamp 24 will light if both the tool ground loop and the insulation resistance is satisfactory. Where the ground loop is defective, then lamp 24 will remain extinguished and the high voltage will not be applied to the tool. Before proceeding further, the defective ground loop must be corrected and thereafter the insulation evaluated. If lamp 28 ignites, then the insulation is defective and must be rectified or the equipment being tested is unsafe and the remaining tests cannot be conducted. A momentary flash of lamp 28, when the switch 7 is closed, should be ignored since this is merely a transient effect.

Where both the ground loop and the insulation circuits indicate safe operation, switch 7 is closed in the operate position which thereby applies the 120 volts directly to the tool under test. By energizing the tool, proper operation may be observed and if satisfactory, then switch 7 is opened and switch 34 closed in the A.C. capacitance test position. Since 120 volt A.C. is employed as opposed to the D.C. previously used in the high voltage test, the current now flowing and indicated by meter 36 is the physical quantity that normally would flow when the tool is used in the field. In other words, with a defective ground circuit, this leakage might flow through the operator's body and it is considered excessive if it exceeds 5 milliamperes.

Although the electrical tester which has been described may be altered as to its components and so vary its characteristic, those values of components shown in FIG. 1 provide the following characteristics:

(a) The equipment insulation is evaluated at a potential of approximately 750 volts D.C. and the tester will visually indicate "defective insulation" in the range from zero ohms to approximately one megohm.

(b) The high voltage D.C. cannot be applied to the tool or equipment under test unless the tool ground loop resistance is less than 0.2 ohm, since the current relay in this circuit will not be activated for a ground current of less than approximately 20 amperes.

(c) Since the tool ground condition is determined at a current around 30 amperes, the tester will respond without difficulty to resistances below 0.2 ohm. This high current will destroy a single strand or corroded grounds and indicate thereby a future source of trouble.

(d) The tester has a self-contained means for determining its correct operation (internal calibration).

(e) The tester will indicate the A.C. leakage or capacitive current independently of the insulation resistance.

Obviously many modifications and variations of the present invention are possible in the light of the above teachings. It is therefore to be understood that within the scope of the appended claims the invention may be practiced otherwise than as specifically described.

I claim:

1. An electrical tester for equipment which is energized through a polarized plug and a cable with one conductor of said cable connected to the metallic frame of such equipment which comprises a metallic reference ground, a double pole-double throw switch, conductor means for connecting the switch poles to a power source and said metallic reference ground to an external ground, a polarized receptacle having a pair of power terminals and a ground terminal which mate with said plug, said ground terminal connected to said reference ground, electrical power conductors connecting one set of the switch contacts to said power terminals, a transformer having one primary winding and a high current-low voltage secondary and a high voltage-low current secondary, said primary winding connected across the other set of switch contacts, a current relay having a winding, a pair of rectifier contacts and a pair of test contacts, each of said contact pairs being normally open, a ground continuity electrical path including in series therein said ground terminal, said current relay winding, said high current secondary, an electrical current limiting resistance, and a ground continuity conductor extending exterior of said tester for connection to said metallic frame, a double pole-single throw switch, having two pairs of contacts whereby when said single throw switch is closed the contacts of each pair are connected to one another, a second resistor connected between one contact of each of said pairs, and one of the terminals of said second resistor connected to said ground terminal, a third resistor connected between one of said receptacle power terminals and another contact of said single throw switch, the remaining free contact of said single throw switch connected to said receptacle ground terminal, full wave rectifier means having input and output terminals, said input terminals connected across said high voltage secondary, rectifier current indicator means connected in series with one rectifier output terminal and said one of said power terminals and said rectifier contacts of said relay, the other rectifier output terminal connected to said reference ground, an electrical test path including in series therein said primary, voltage test indicator means and said test relay contacts.

2. The tester according to claim 1, wherein said metallic reference ground is a metallic housing for enclosing and supporting said tester.

3. The tester according to claim 1, wherein said ground continuity conductor includes a single terminal receptacle, a cable having at one end thereof a plug which mates with said receptacle and means at the other end for making electrical contact with said metallic frame.

4. The tester according to claim 1, wherein said rectifier current indicator means is a variable resistor having a lamp connected across the slide contact and one end thereof.

5. The tester according to claim 1, wherein said voltage test indicator means is a resistor in series with a lamp.

6. The tester according to claim 1, wherein said rectifier means is a bridge rectifier having connected therein asymmetrical semiconductor elements.

7. The tester according to claim 1, wherein said current limiting resistance is a variable resistor.

References Cited in the file of this patent
UNITED STATES PATENTS

| | | |
|---|---|---|
| 2,806,993 | Matouesk | Sept. 17, 1957 |
| 2,840,781 | Ragonese | June 24, 1958 |
| 2,858,507 | Liautaud et al. | Oct. 28, 1958 |
| 2,960,654 | Nelson | Nov. 15, 1960 |
| 2,994,819 | Vincent | Aug. 1, 1961 |